April 15, 1930.    R. J. POMEROY    1,755,130
METHOD OF MAKING COMPOSITE PHOTOGRAPHS
Filed July 14, 1926

LATENT IMAGE OF ACTION

REDEVELOPED

DEVELOPED – BLACK AND WHITE NEGATIVE

EXPOSED TO BACKGROUND SCENE

COATED WITH PIGMENTED CASEIN

DEVELOPED AND FIXED

BLEACHED

COMPOSITE NEG. AFTER REMOVAL OF CASEIN

WASHED
Inventor
Roy J. Pomeroy.
Attorney.

Patented Apr. 15, 1930

1,755,130

UNITED STATES PATENT OFFICE

ROY J. POMEROY, OF LOS ANGELES, CALIFORNIA, ASSIGNOR OF ONE-HALF TO FAMOUS PLAYERS-LASKY CORPORATION, OF LOS ANGELES, CALIFORNIA, A CORPORATION OF NEW YORK

METHOD OF MAKING COMPOSITE PHOTOGRAPHS

Application filed July 14, 1926. Serial No. 122,503.

This invention has to do with methods of making composite photographs, or with what is more commonly known as a method of double exposure; the general object of such a method being to obtain upon a single photograph or film two or more images taken at different times or places. In motion picture photography such double exposure methods are used for the purpose of placing an action apparently in a scene or before a background foreign to the actual action.

In most, if not all, the present schemes of double exposure, a plurality of films must be used, it being a more or less common practice to take the action on one film and the background on another film, then print the two original films onto another on which the composite is obtained. It is one of the objects of this invention to provide a method of obtaining composite photographs or double exposure effects with the use of only one film or negative; and the invention also has further objects in the direction of simplicity, accuracy, ease of manipulation, etc., all as will best be understood from a consideration of the following detailed specification.

I shall explain the method as for making a composite picture to show an action in a scene or before a background not actually associated with the action; but it will be well understood that the method can be used for obtaining composite photographs of any desired subject.

The particular method herein described is similar to methods described in my application Serial Number 122,502, filed on even date herewith and also entitled Method of making composite photographs, wherein claims are made generic to the method described in these two applications, while the claims in this present application are specific to the particular method herein described.

Throughout the specification reference is had to the accompanying drawings, in which.

Figure 1:
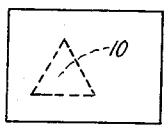
Fig. 1 shows a negative after exposure to action.

In carrying out the present method the negative is exposed to the action against a black or non-actinic ground, so that the exposed negative will then carry a latent image 10 of the action in a ground unaffected by light (see Fig. 1).

Figure 2:
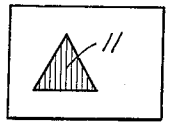
Fig. 2 shows the exposed negative after developing.

Next this film is developed in the usual manner but is not fixed at this time. The film then shows the image 11 of the action in a clear ground; but the clear ground and the undeveloped parts of the image area are still actinic. See Fig. 2, wherein shading of image does not represent color but black and white tones.

Figure 3:
Fig. 3 shows the negative after being coated with pigmented casein.

Next the film is coated with a thin layer of casein carrying an opaque or non-actinic pigment which is neutral to the chemicals used in the method. The pigment known as Indian red is suitable for this purpose. Or a clear coat of casein can be put on and a suitably colored ink can be rolled in. And instead of casein any other suitable colloid, such as soft gelatin, may be used (see Fig. 3).

Figure 4:
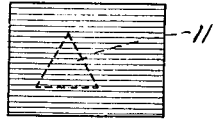
Fig. 4 shows the negative after bleaching.

Then the coated film is next bleached with a solution capable of hardening the gelatin and the casein where there is present metallic silver (see Fig. 4). A bleach suitable for this purpose is one that contains approximately, by weight, water 96.65%, quinones .55%, potassium bromide 2.8%. A slight amount of acetic acid may be used, but is not essential. This bleach has no effect on the unexposed and undeveloped portions of the film, but transforms the developed parts of the film to a reddish brown color, the metallic silver being probably transformed to silver oxi-bromide. In this transformation there are certain bleaching by-products liberated and these by-products harden the gelatin of the film and the casein coat, rendering that part of the coat hard enough that it is not easily dissolved in the solvent that is next used to remove the unaffected parts of the casein. It will be understood that the casein with its opaque or non-actinic pigment is hardened more or less over all portions of the film that have been exposed, and although the hardening may be more or less proportionate to the reduced silver present at any given point, the hardening over the whole surface of the exposed area is sufficient for the purpose of covering and protecting the unexposed and undeveloped silver halid that still remains within the exposed area.

Figure 6:
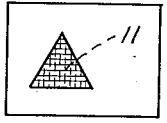
Fig. 6 shows the negative after redevelopment.
Figure 5:
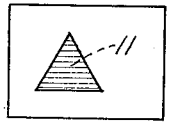
Fig. 5 shows the negative with the casein washed away except the hardened portion over the action image.

Next the film is treated with a dilute alkaline solution such as sodium or potassium hydroxide solution which washes off the unaffected or unhardened parts of the pigmented casein, so that then the previously unexposed and undeveloped portions of the film are uncovered while the previously exposed area or areas are left covered with the pigmented casein (see Fig. 5). Thus the pigmented casein performs the function of protecting the previously exposed area or areas against further actinic action on the second exposure. The oxi-bromide image can then be redeveloped with amidol (diamidophenol hydrochloride) or glycine (para-oxy-phenyl-glycine) if desired to be done at this point in the process (see Fig. 6). This is not necessary at this point but preferable, because on the final development the hardened gelatin may slow down the development of the first image relatively to the development of the second image.

Instead of using a pigment such as Indian red and removing it along with the hardened casein at the last, a pigment or dye soluble in hypo may be used. For instance a hypo soluble pigment may be produced by reaction of fuchsine and precipitated silver iodide. This is then used in the casein and is washed out in the hypo bath, the clear casein being finally removed with the hydroxide solution, if desired, but not necessarily.

Figure 7:
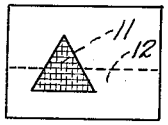
Fig. 7 shows the negative after exposure to the background scene.

Then the film is washed and dried and is re-exposed to the background or scene in which it is wished to have the action appear to take place (see Fig. 7).

Figure 8:
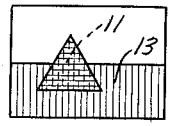
Fig. 8 shows the negative after developing and fixing.

Next the film is finally developed in any suitable non-staining developer, such as amidol or glycin. This final development not only redevelops (again reduces) the bleached silver of the first image, if it has not been previously developed, but also develops the image of the second exposure (see Fig. 8).

Figure 9:
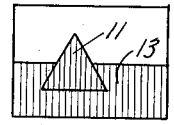
Fig. 9 shows the composite negative resulting after removal of the hardened casein from the action image.

Then the film is finally fixed with any suitable fixing solution, as for instance hypo and this fixing solution also removes any excess bleaching products. Then the hardened casein is finally removed with potassium or sodium hydroxide (see Fig. 9).

With proper control of the several operations involved in the method herein described the two final images are made to match each other very accurately, so that the action image then appears as if it were naturally in the background that is then shown on the composite photograph. Proper control for this purpose is not difficult, being mainly in correct control of development and bleaching and hardening of the casein coat, so that the hardened casein coat after removal of the soft portions corresponds as exactly as possible with the area of the first image.

I claim:

1. The herein described method of producing composite photographs, that includes first exposing a limited portion of a fresh actinic surface to obtain thereon a first image, developing said first image, coating the surface with casein carrying a non-actinic pigment, treating the surface to transform the developed silver and to harden locally the casein, removing the remaining soft portions of the casein, re-exposing the surface to obtain an image on the previously unexposed parts, and finally developing and fixing the surface and removing the hardened casein.

2. The herein described method of producing composite photographs, that includes first exposing a limited portion of a fresh actinic surface to obtain thereon a first image, developing said first image, coating the surface with a layer of casein carrying a non-actinic pigment, treating the surface with a quinone bleach and thereby transforming the developed silver and locally hardening the casein, then treating the casein with an alkali hydroxide and thereby dissolving off the unhardened parts of the casein coat, re-exposing the surface to obtain an image on the previously unexposed part, and then finally developing and fixing the whole surface and removing the hardened casein.

3. The herein described method of producing composite photographs, that includes first exposing a limited portion of a fresh actinic surface to obtain thereon a first image, developing said first image, coating the surface with colloid carrying a non-actinic pigment, treating the surface to transform the developed silver and to harden locally the colloid, removing the remaining soft portions of the colloid, re-exposing the film to the surface to obtain an image on the previously unexposed parts, and finally developing and fixing the surface and removing the hardened colloid.

4. The herein described method of producing composite photographs, that includes first exposing a limited portion of a fresh actinic surface to obtain thereon a first image, developing said first image, coating the surface with a layer of colloid carrying a non-actinic pigment, treating the surface with a quinone bleach and thereby transforming the developed silver and locally hardening the colloid, then treating the colloid with an alkali hydroxide and thereby dissolving off the unhardened parts of the colloid coat, re-exposing the surface to obtain an image on the previously unexposed part, and then finally developing and fixing the whole surface and removing the hardened colloid.

5. The herein described method of producing composite photographs, that includes first exposing a limited portion of a fresh actinic surface to obtain thereon a first image, developing said first image, coating the surface with casein carrying a non-actinic pigment, treating the surface to transform the developed silver and to harden locally the casein, removing the remaining soft portions of the casein, redeveloping the transformed silver of the image, re-exposing the surface to obtain an image on the previously unexposed parts, and finally developing the last exposed part of the surface and fixing the surface and removing the hardened casein.

In witness that I claim the foregoing I have hereunto subscribed my name this 30 day of June, 1926.

ROY J. POMEROY.